(12) United States Patent
Chapman (10) Patent No.: US 6,967,900 B2
(45) Date of Patent: Nov. 22, 2005

(54) COMBINATION CLOCK RADIO, WEATHER STATION AND MESSAGE ORGANIZER

(75) Inventor: Peter A. Chapman, Avon By The Sea, NJ (US)

(73) Assignee: Maverick Industries, Inc., Edison, NJ (US)

( * ) Notice: Subject to any disclaimer, the term of this patent is extended or adjusted under 35 U.S.C. 154(b) by 346 days.

(21) Appl. No.: 10/243,604

(22) Filed: Sep. 13, 2002

(65) Prior Publication Data

US 2003/0076745 A1 Apr. 24, 2003

Related U.S. Application Data

(60) Provisional application No. 60/338,496, filed on Oct. 22, 2001.

(51) Int. Cl.[7] .................. G04B 47/00; G04B 47/06; G04B 19/04; G08B 1/08; G01K 7/00
(52) U.S. Cl. .................. 368/10; 368/11; 368/63; 368/73; 368/82; 368/223; 368/251; 340/539.28; 374/143; 374/162
(58) Field of Search .................. 368/10, 11, 63, 368/72–74, 82, 223, 250, 251; 340/539.1, 539.22, 539.26, 539.28; 374/142, 143, 162

(56) References Cited

U.S. PATENT DOCUMENTS

| | | | | |
|---|---|---|---|---|
| 3,156,990 | A | * 11/1964 | Dock | 40/573 |
| 3,763,647 | A | * 10/1973 | Shibanai | 368/235 |
| 3,840,924 | A | 10/1974 | Hamilton | |
| 4,070,697 | A | 1/1978 | Miller et al. | |
| 4,228,470 | A | 10/1980 | Rahamin et al. | |
| 4,428,685 | A | * 1/1984 | Lemelson et al. | 374/163 |
| 4,451,157 | A | * 5/1984 | Reap | 368/11 |
| 4,687,340 | A | * 8/1987 | Havel | 368/10 |
| 4,705,406 | A | * 11/1987 | Havel | 368/10 |
| 4,707,141 | A | * 11/1987 | Havel | 368/11 |
| 5,199,009 | A | 3/1993 | Svast | |
| 5,365,494 | A | 11/1994 | Lynch | |
| 5,484,205 | A | * 1/1996 | Grupp et al. | 374/142 |
| 5,790,477 | A | 8/1998 | Hauke | |
| 5,808,211 | A | * 9/1998 | Fujima | 73/866.3 |
| 5,844,862 | A | 12/1998 | Cocatre-Zilgien | |
| 5,926,440 | A | 7/1999 | Chen | |
| 5,943,630 | A | * 8/1999 | Busby et al. | 702/3 |
| 5,978,738 | A | 11/1999 | Brown | |
| 6,031,579 | A | * 2/2000 | Stephenson | 348/564 |
| 6,046,674 | A | * 4/2000 | Irwin et al. | 340/539.28 |
| 6,076,044 | A | 6/2000 | Brown | |
| 6,229,430 | B1 | 5/2001 | Smith Dewey | |
| 6,236,622 | B1 | 5/2001 | Blackman | |
| 6,449,219 | B1 | 9/2002 | Hepp | |
| 6,597,990 | B2 | 7/2003 | Brown | |

OTHER PUBLICATIONS

US 5,867,805, 2/1999, Brown (withdrawn)

* cited by examiner

Primary Examiner—Vit W. Miska
(74) Attorney, Agent, or Firm—Lerner, David, Littenberg, Krumholz & Mentlik, LLP (57) ABSTRACT

A combination clock radio, weather station and message organizer includes a base unit having a visual display, a controller located in the base unit including a central processor for controlling operation of the combination, and a temperature sensor for obtaining outdoor temperature readings, the temperature sensor being in communication with the controller. The controller is adapted to present a hue on the visual display that is a function of the outdoor temperature reading. The combination may also include a pressure sensor in communication with the controller for monitoring a rate of change in atmospheric pressure and providing a weather forecast animation that is a function of the changes in the atmospheric pressure.

30 Claims, 9 Drawing Sheets

COMBINATION CLOCK RADIO, WEATHER STATION AND MESSAGE ORGANIZER

CROSS REFERENCE TO RELATED APPLICATIONS

The present application claims the benefit of U.S. Provisional Application No. 60/338,496 filed Oct. 22, 2001.

FIELD OF THE INVENTION

The present invention is related to clock radios and is particularly related to clock radios incorporating a weather station and message organizer.

BACKGROUND OF THE INVENTION

Clock radios are widely used to save valuable space on a desk or end table. These devices incorporate a clock and alarm for waking up users, as well a radio for broadcasting news and music.

There have been a number of improvements in clock radios. For example, U.S. Pat. No. 5,199,009 discloses a programmable clock including a memory for storing times, dates and messages for subsequent display to provide reminders for events such as birthdays, anniversaries and doctor appointments. At the designated time and date, the messages are displayed in an alphanumeric format.

U.S. Pat. No. 4,228,470 teaches an electronic reminder system for recording spoken messages that are played back at a future point in time. The system includes a microphone for recording the messages, a keyboard for inputting data representing the future point in time at which the respective messages are to be played back, a clock for measuring time, a controller for signaling the arrival of each specified point in time, and a speaker for broadcasting the previously recorded message.

U.S. Pat. No. 4,070,697 discloses a clock radio including an audio recording system for recording information regarding future appointments. The information input into the system is designated with a particular month and day for playback. The recorded information is played back on the designated date when the user is awakened by an alarm.

Despite the above-mentioned improvements in clock radios, there remains a need for a combination unit that incorporates a clock radio, a weather station, and a message organizer for recording spoken messages that may be played back at a specified future time.

SUMMARY OF THE INVENTION

A combination clock radio, weather station and message organizer includes a base unit having a visual display, a controller located in the base unit including a central processor for controlling operation of the combination, and a temperature sensor spaced from the base unit for obtaining outdoor temperature readings, the temperature sensor being in communication with the controller. The controller is adapted to generate a hue on the visual display that is a function of the outdoor temperature reading. In certain embodiments, the hue generated on said visual display desirably changes in response to the outdoor temperature reading. In other preferred embodiments, the hue is a first color when the outdoor temperature reading is within a first temperature range and a second color when the outdoor temperature range is within a second temperature range that is exclusive of the first temperature range. In still other preferred embodiments, the hue is a third color when the outdoor temperature range is within a third temperature range that is exclusive of the first and second temperature ranges. In highly preferred embodiments, the first color may be blue, the second color may be amber and the third color may be red. In some embodiments, the first temperature range is between −50 and 50° F., the second temperature range is between 50.1 and 75.0° F. and the third temperature range is between 75.1 and 140° F. In other preferred embodiments, the temperature ranges and the number of different background hues may vary.

The temperature sensor is spaced from the base unit and preferably includes a radio frequency transmitter for transmitting the outdoor temperature readings to the base unit. The combination unit also preferably includes a radio frequency receiver associated with the base unit, the radio frequency receiver being adapted to receive the outdoor temperature readings transmitted by the radio frequency transmitter and relay the outdoor temperature readings to the controller of the combination unit.

In certain preferred embodiments, the combination unit also includes a pressure sensor in communication with the controller for measuring atmospheric pressure. The controller is preferably adapted to select one of a plurality of weather forecast animations as a function of a rate of change of the measured atmospheric pressure and to generate the selected weather forecast animation on the visual display. The weather forecast animations are desirably selected from the group consisting of a sun animation, a sun and cloud animation, a cloud animation, a rain animation, and a storm animation. In other embodiments, other forecast animations may be used so as to provide additional means for displaying weather forecasts. Each of the weather forecast animations preferably includes a series of images that are generated on the visual display to give the illusion of motion. For example, the sun and cloud animation may include a first image that only shows the sun, followed by images that give the illusion that clouds are moving at least partially in front of the sun.

In certain preferred embodiments, the controller is also adapted to select one of a plurality of weather tendency indicators that is a function of the rate of change of the atmospheric pressure. Based upon the rate of change of the atmospheric pressure, the controller will generate the selected weather tendency indicator on the visual display. Preferred weather tendency indicators include a tendency up indicator, a tendency down indicator, and a tendency steady indicator.

The combination unit may also include a microphone in communication with the controller for recording spoken messages, a memory device for storing the recorded spoken messages, and a speaker in communication with the controller for broadcasting the recorded spoken messages at a predetermined wake-up time. In operation, upon reaching the predetermined wake-up time, the controller will broadcast through the speaker at least one wake-up alarm, a voice message related to the predetermined wake-up time, and a voice message related to the outdoor temperature reading, as well as any of the recorded spoken messages. In certain preferred embodiments, the full alarm mode sequence will be as follows: BI-BI-BI-BI for five seconds, followed by "good morning" or "good afternoon" or "good evening" "It is 7:00 a.m.—the temperature outside is 70 degrees—the weather is going to be sunny." All recorded messages will then be played back and the radio will play for one hour. Other wake-up routines may vary depending upon the software stored in the controller.

The combination unit may also include movable keys associated with the base unit and in communication with the controller for selecting a radio band, a predetermined wake-up time and commencing recordation of the spoken messages. Other moveable keys may be used for controlling overall operation of the combination unit.

In other preferred embodiments of the present invention, a combination clock radio, weather station and message organizer may include a base unit having a visual display, a controller located in the base unit including a central processor for controlling operation of the combination, a pressure sensor for measuring atmospheric pressure in communication with the controller, and a remote temperature sensor spaced from the base unit for obtaining outdoor temperature readings, the temperature sensor including a radio frequency transmitter for transmitting signals related to the outdoor temperature readings. The combination unit may also desirably include a radio frequency receiver provided in the base unit for receiving the signals related to the outdoor temperature readings and communicating the signals to the controller, whereby the controller is adapted to select one of a plurality of weather tendency forecast animations as a function of the atmospheric pressure and to generate the selected weather forecast animations on the visual display, the controller being adapted to generate a hue on the visual display that is a function of the outdoor temperature reading.

In some preferred embodiments, the base unit includes a stand, a support element connected to the stand, and a housing including a visual display connected to the support element. The support arm desirably includes a pivotal connection between the housing and the stand so that the housing may be pivoted and moved relative to the stand. The base unit also desirably includes movable keys in communication with the controller for selecting a radio band, selecting a wake-up time and date, and commencing recordation of the one or more spoken memoranda. In certain preferred embodiments, the visual display is a liquid crystal display adapted to display the hue on a color scale running from violet through green, blue and red through yellow. The temperature sensor may be a thermistor and the pressure sensor is desirably adapted to produce an output signal that is linearly related to the atmospheric pressure.

In still other preferred embodiments of the present invention, a combination clock radio, weather station and message organizer includes a base unit having a visual display for presenting radio band information, time information, date information, weather information and spoken message information. The combination unit includes a microphone for recording the spoken messages, a speaker for broadcasting radio signals, at least one wakeup alarm signal and the recorded spoken messages, and a controller associated with the base unit. The controller desirably includes a central processor for controlling operation of the combination, the central processor being in communication with the microphone and the speaker. The combination unit also desirably includes a temperature sensor spaced from and in communication with the base unit for obtaining outdoor temperature readings and transmitting the outdoor temperature readings to the base unit, and data entry keys associated with the base unit for selecting one or more radio stations, selecting a predetermined wake-up time, and recording the spoken messages, wherein upon reaching the predetermined wake-up time, the controller will generate through the speaker a wake-up alarm, a voice message related to the predetermined wake-up time, a voice message related to the outdoor temperature, and any previously recorded spoken messages. In certain preferred embodiments, the combination unit includes a second temperature sensor associated with the base unit for obtaining indoor temperature readings and communicating the indoor temperature readings with the controller. In these embodiments, the controller is adapted to generate the indoor temperature readings on the visual display. As a result, a user may compare the indoor temperature readings obtained by the second temperature sensor to the outdoor temperature readings obtained by the remote first temperature sensor.

These and other preferred embodiments of the present invention will be described in more detail below.

DETAILED DESCRIPTION

Figure 1:
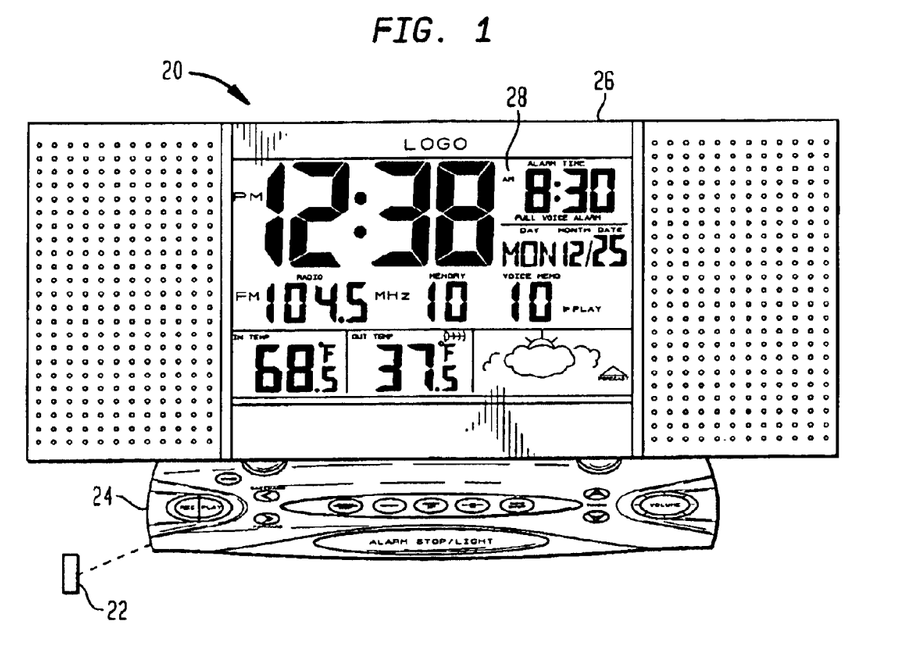
FIG. 1 shows a front elevational view of a combination clock radio, weather station and message organizer, in accordance with certain preferred embodiments of the present invention.

FIG. 1 shows a combination clock radio, weather station and message organizer including a base unit 20 and a temperature sensor 22 spaced from the base unit 20. In certain preferred embodiments, the temperature sensor 22 includes a wireless transmitter for wirelessly transmitting outdoor temperature readings from temperature sensor 22 to the base unit 20. Base unit 20 preferably includes a stand 24 and a housing 26, including a visual display 28. The visual display 28 is desirably a Liquid Crystal Display (LCD). The base unit 20 also preferably includes a support element (not shown) extending between the stand 24 and the housing 26 for supporting the housing 26 above the stand.

Figure 2:
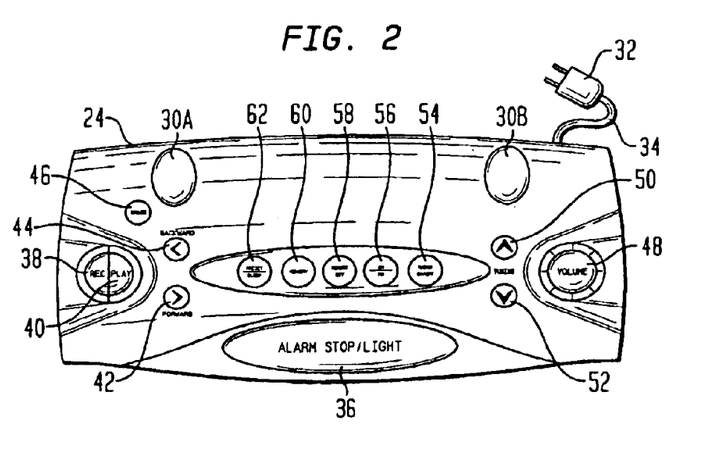
FIG. 2 shows a top plan view of a stand for the combination unit of FIG. 1.

Stand 24 may include recesses 30*a*, 30*b* adapted to receive lower ends of support element (not shown) for housing 26. Stand 24 also desirably includes an electrical plug 32 and an electrical wire 34 extending between plug 32 and stand 24. In other preferred embodiments, the electrical plug 32 and wire 34 may be connected to any portion of the base unit for supplying power thereto. The combination unit may also be powered by batteries.

Stand 24 preferably includes buttons and/or knobs for controlling operation of the combination clock radio, weather station and message organizer. Some of the buttons and/or knobs are directed to controlling the message organizer and other buttons and/or knobs are directed to controlling the radio. Referring to FIG. 2, in certain preferred embodiments, stand 24 includes a depressible alarm stop/light button 36 that may be depressed for stopping a wake-up alarm or for illuminating a back-up light on visual display (FIG. 1). Stand 24 also includes a "record" button 38 for recording voice messages and a play button 40 for playing back the recorded voice messages. Stand 24 also preferably includes a "forward" button 42 for advancing forward to the next recorded message and a "backward" button 44 for rewinding to previously played messages. Stand 24 also desirably includes an "erase" button 46 that may be depressed for erasing all of the recorded voice messages.

Stand 24 preferably has a volume knob 48 that may be rotated in a first direction for decreasing radio volume and a second direction for increasing radio volume. Stand 24 may also include respective "tuning-up" button 50 and a "tuning-down" button 52 for selecting radio stations up and down the radio band. Stand 24 also includes a radio "on/off" button 54, and an "AM/FM band selection" button 56, a "memory/set" button 58 for saving certain radio stations in memory, a "memory" button 60 for skipping to the radio stations saved in memory, and a "pre-set/sleep" button 62 for selecting a period of time before the radio is automatically turned off.

Figure 3:
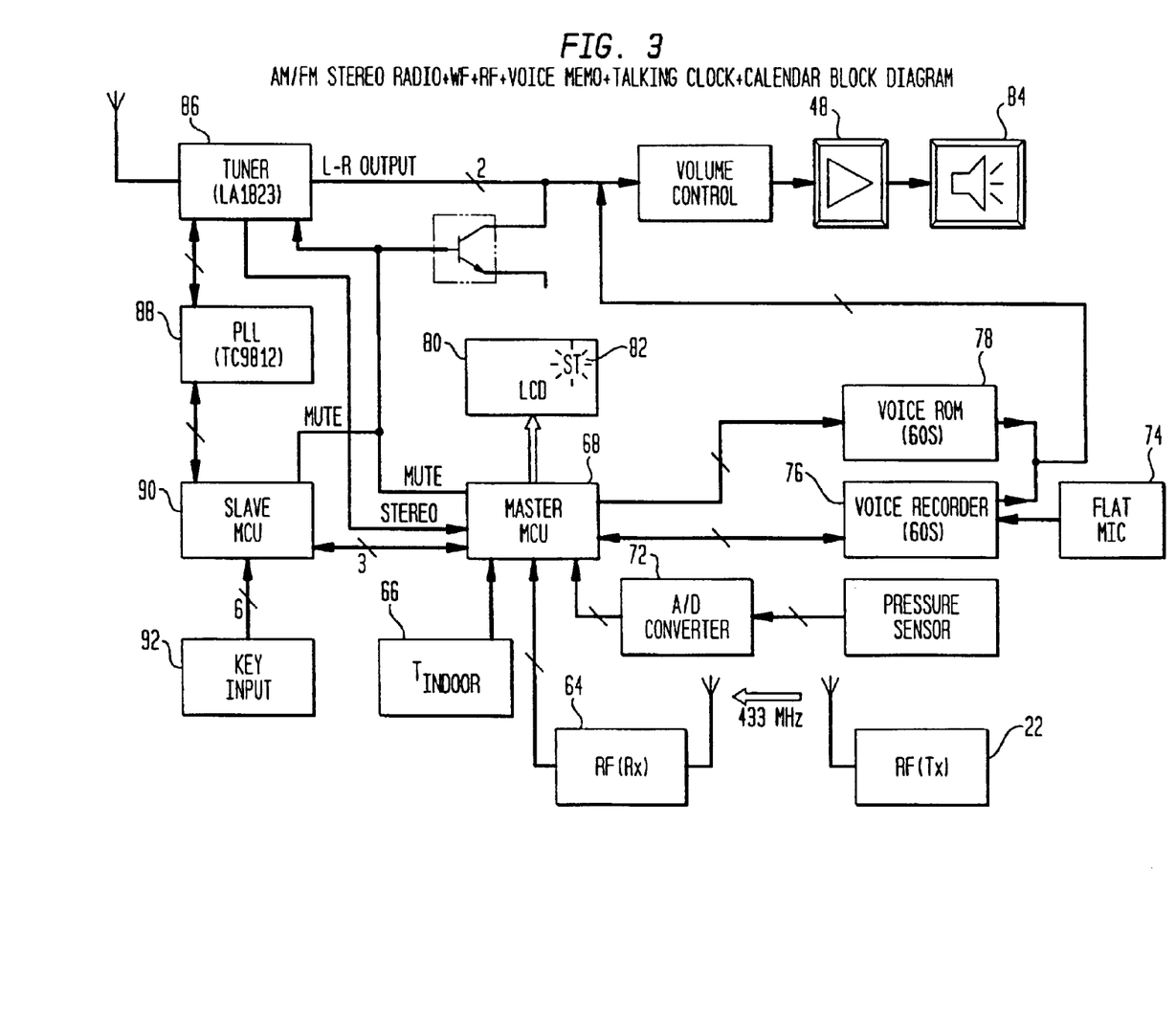
FIG. 3 shows a block diagram of electronic circuitry of the combination unit shown in FIG. 1, in accordance with certain preferred embodiments of the present invention.

FIG. 3 shows a block diagram of the electronic circuitry incorporated into the combination clock radio, weather station and message organizer, in accordance with certain preferred embodiments of the present invention. The combination unit preferably includes outdoor temperature sensor 22 that obtains outdoor temperature readings and transmits temperature signals via radio frequency waves to radio frequency receiver 64. The outdoor temperature sensor 22 is preferably spaced remotely from the radio frequency receiver 64, which is desirably incorporated into the base unit 20 (FIG. 1). In one preferred embodiment, the frequency of the radio waves used to transmit the outdoor temperature readings is 433 MHz, although other radio frequencies may be readily used. The combination unit may also include an indoor temperature sensor 66 for obtaining indoor temperature readings. The outdoor and indoor temperature readings obtained by the respective outdoor and indoor temperature sensors are forwarded to central processor 68.

The weather tendency indicator, which is indicated by an "up" or "down" arrow, is updated every thirty minutes. An "up" arrow preferably indicates a significant increase in atmospheric pressure. In contrast, a "down" arrow is showing a significant decrease in atmospheric pressure.

In certain preferred embodiments, the temperature sensor is a 103AT-2B thermistor that is capable of measuring temperature ranges from 0–+40° C. with an error of less than ±1° C. and other ranges with an error of less than ±10° C. In operation, the normal interval for sampling temperatures is approximately 4–8 seconds. However, other time intervals may be desirably used.

The present invention includes a feature whereby the maximum temperature recorded for a time period (e.g. a day) and the minimum temperature recorded during a time period may be temporarily shown. This may be accomplished by pressing the MAX-MIN button a first time to display the maximum temperature recorded during the period and a second time to display the minimum temperature recorded during the period. The maximum or minimum temperature will preferably be shown for approximately five seconds. After that time, the currently recorded outdoor and indoor temperatures will be displayed. Pressing the "clear" button will start a new period for recording the maximum and minimum temperatures.

The combination unit also desirably includes a pressure sensor 70 in communication with central processor 68. Pressure sensor 70 preferably obtains atmospheric pressure readings and forwards pressure signals through A/D converter 72, which in turn forwards the signals to central processor 68. The combination unit also preferably includes a microphone 74 in communication with a voice recorder chip 76 for recording spoken messages and a voice memory chip 78 for storing the recorded messages. Both the voice recorder 76 and the voice memory chip 78 are in communication with the central processor 68.

The combination unit also includes a liquid crystal display 80 that preferably displays information related to the current time, wake-up time, day, month, date, radio band, number of messages recorded on voice ROM chip 78, indoor temperature, outdoor temperature, weather forecast animations and weather tendency indicators. The LCD also desirably includes a backlight 82 that may be activated by pushing the light button 36 shown in FIG. 2.

The combination unit also preferably includes a speaker 84 and a volume control knob 48 for adjusting the volume of the sound generated by the speaker. The combination unit preferably has a tuner chip 86 that is adapted to receive AM/FM and short-wave radio signals, a PLL chip 88 and a slave or supplemental processor chip 90. The combination unit also desirably includes input keys 92 that were shown and described above in conjunction with FIG. 2.

Figure 4:
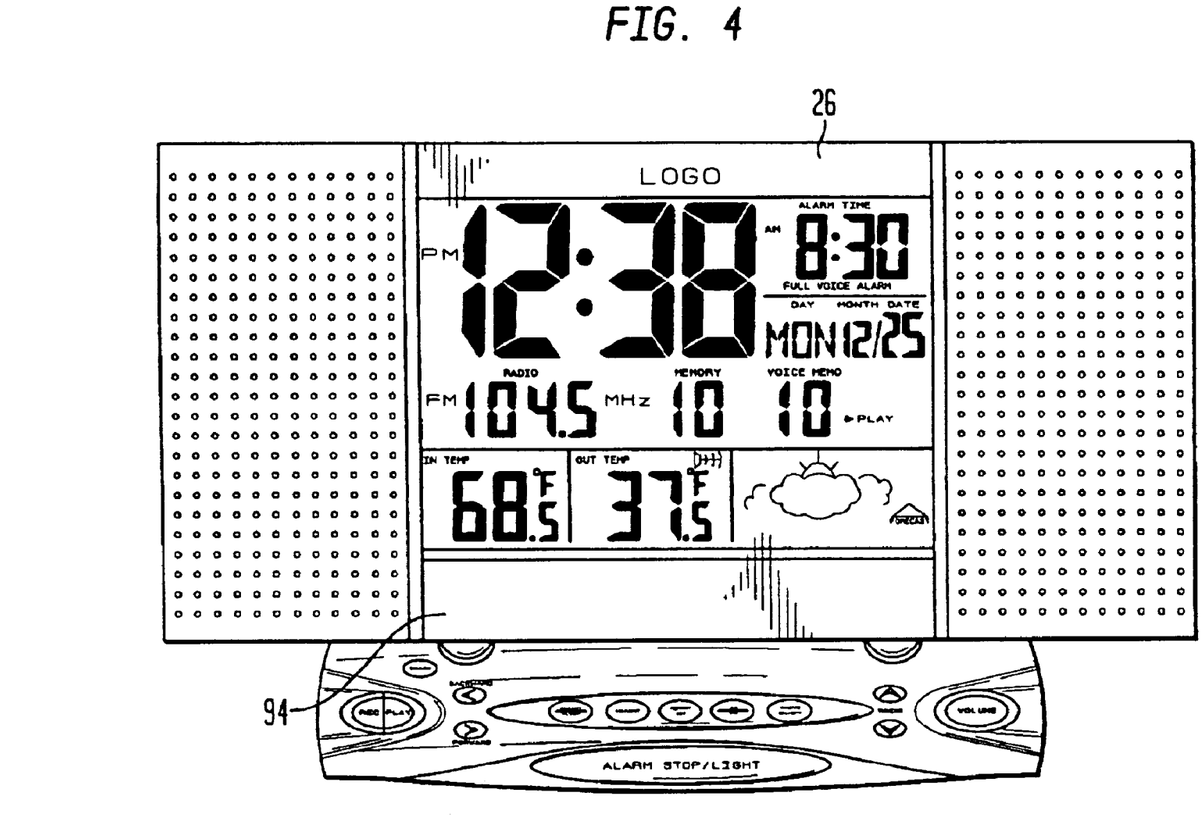
FIG. 4 shows a combination clock radio, weather station and message organizer with a movable cover over a time/alarm time/calendar set compartment.
Figure 5:
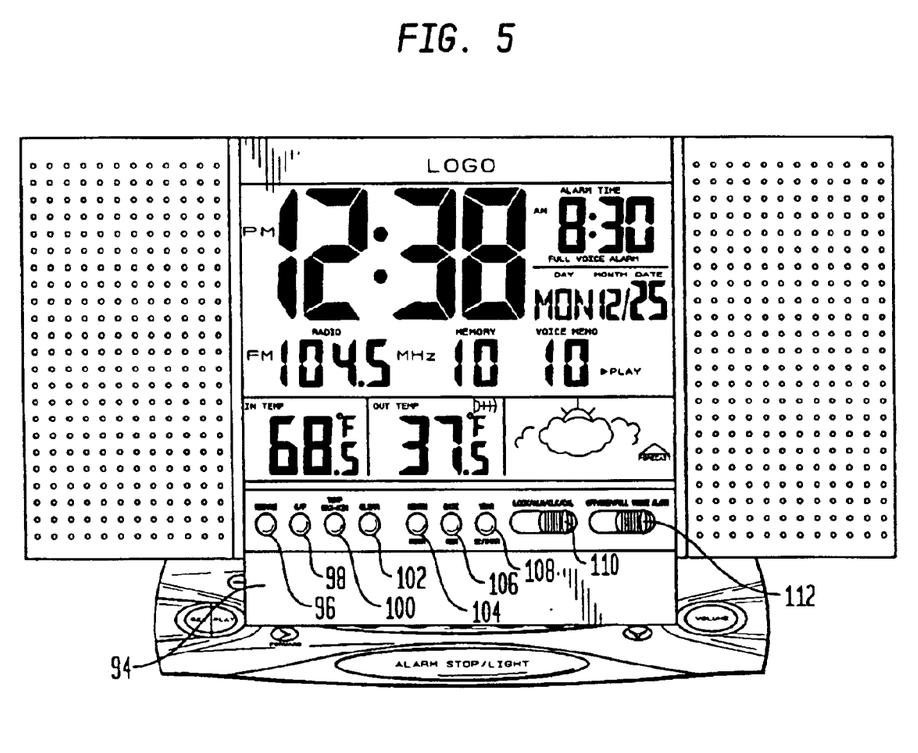
FIG. 5 shows the movable cover of FIG. 4 in an open position.

Referring to FIGS. 4 and 5, in certain preferred embodiments, housing 26 includes a cover 94 that is movable between the closed position shown in FIG. 4 and the open position shown in FIG. 5. The movable cover 94 normally covers a control panel including buttons and switches related to temperature, time and alarm settings. The buttons/switches include a "resynchronization" button 96 for resynchronizing the indoor and outdoor temperatures, a "C/F" button 98 for displaying the temperature readings in either Celsius or Fahrenheit, a temperature "MAX/MIN" button 100 for displaying the recently recorded maximum and minimum temperatures, and a "clear" button 102 for clearing the recently recorded maximum and minimum temperatures. For example, if the highest temperature in a period is 98° F., then 98° F. will be displayed when the MAX button 100 is pushed. When the button 100 is pushed again, the minimum temperature recorded during the period will be displayed. A new MAX/MIN period may be started by pushing the "clear" button 102. The new MAX/MIN period will be in effect until the "clear" button 102 is pushed again. The panel also includes a "month/hour" button 104, a "day/minute" button 106 and a "year/12/24-hour" button 108 for setting calendar dates and times. The panel also includes a lock/alarm/clock/calendar slide switch 110 and an off/beep/full voice alarm switch 112 for selecting the particular element of the calendar date and time to be adjusted.

The combination unit includes a clock with a 12/24 hour function that may display time from 12:00 a.m. to 11:59 a.m. and 12:00 p.m. to 11:59 p.m. in a 12 hour mode and from 0:00 to 23:59 in a 24 hour mode. The 12/24 hour mode can be selected by 12/24 HR button 108 (FIG. 5). When the combination unit is initially activated, the clock initializes at 12:00 a.m. in the 12 hour mode or 0:00 in the 24 hour mode, depending upon the position of the 12/24 hour switch. Referring to FIG. 5, the clock may be set by placing the mode switch 110 to "clock-set" position. During the "clock-set" position, the time and colon flashes on for ⅔ of a second and off for ⅓ of a second to indicate that a clock setting is taking place. The hour advances one hour each push of the hour button 104 and auto advances at 8 Hz when pressed and held down. Similarly, the minute portion of the clock reading advances one minute each time the minute button 106 is pressed and auto advances at 8 Hz when the minute button is pressed and held. The clock is restored to normal operation by placing the mode switch 110 to the "lock" position. The colon on the time clock flashes with ⅔ second on and ⅓ second off during normal operation.

Figure 6:
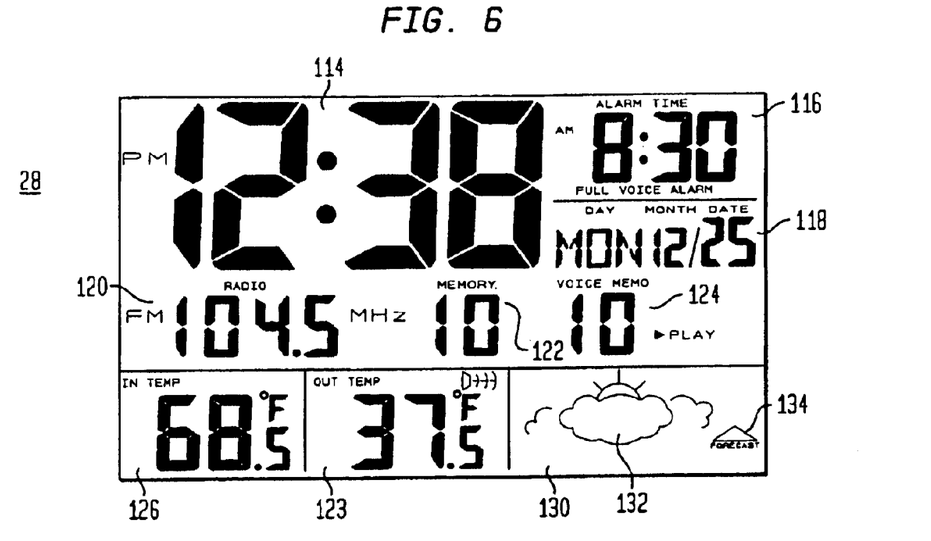
FIG. 6 shows a visual display of the combination unit of FIG. 1, in accordance with certain preferred embodiments of the present invention.

FIG. 6 shows a visual display for the combination unit in accordance with certain preferred embodiments of the present invention. The visual display 28 preferably includes a first region 114 for displaying time, a second region 116 for displaying an alarm wake-up time, a third region 118 for displaying the day, month and date and a fourth region 120 for displaying the radio band currently selected for play on the unit. The visual display also preferably includes a fifth region 122 showing the number of voice messages recorded and stored in memory and a sixth region 124 showing the number for the particular voice message currently being played back. The visual display 28 also includes an indoor temperature region 126 that displays the measured indoor temperature, as well as an outdoor temperature region 128 showing the measured outdoor temperature. Visual display 28 also includes a weather forecast region 130 showing weather forecast animations 132 and a weather tendency indicator region 134 showing weather tendency indicators.

Figure 7:
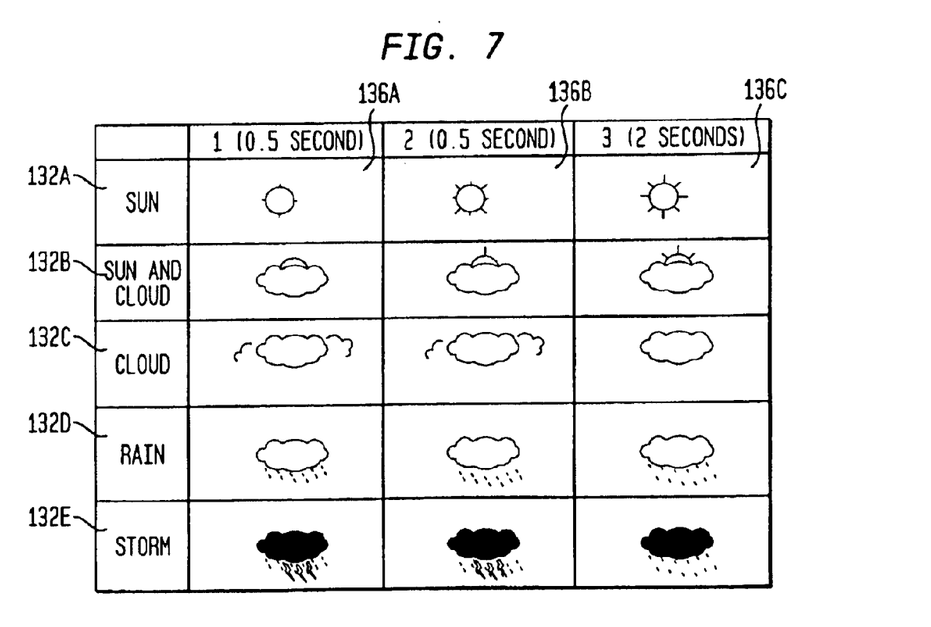
FIG. 7 shows weather forecast animations for the visual display of FIG. 6, in accordance with certain preferred embodiments of the present invention.

Referring to FIG. 7, the weather forecast animations preferably include a series of panels that are slightly different from one another to give the illusion of motion. The panels shown in FIG. 7 are for illustration only and do not include all of the panels in a particular animation series. As such, there may be intermediate panels between those shown. The weather forecast animations include a sun animation 132a, a sun and cloud animation 132b, a cloud animation 132c, a rain animation 132d and a storm animation 132e. Based upon changes in the rate of atmospheric pressure obtained by pressure sensor 70 (FIG. 3), the central processor will select one of the weather forecast animations to be displayed in the weather forecast animation region 130. For example, if the rate of atmospheric pressure is increasing, the central processor may select the sun animation 132a. The first sun animation panel 136a may be displayed, followed by the second sun animation panel 136b, followed by the third sun animation panel 136c. The exact length of time that each panel is displayed may vary.

Figure 8:
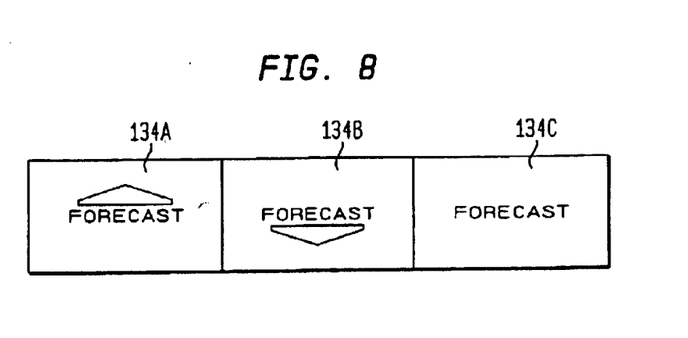
FIG. 8 shows weather tendency indicators for the visual display of FIG. 6, in accordance with still other preferred embodiments of the present invention.

FIG. 8 shows weather tendency indicators 134a, 134b and 134c. The weather tendency indicators 134a–134c are displayed exclusive of one another in the weather tendency region 134 of the visual display 28. The up arrow panel 134a is displayed when there has been a significant increase in atmospheric pressure, which normally yields better weather. The down arrow indicator 134B is shown when there has been a significant decrease in atmospheric pressure, which normally results in worsening weather. The stable indicator panel 134c is shown when there is no significant change in atmospheric pressure.

In preferred embodiments, the atmospheric pressure is measured using a calibrated pressure sensor with the output resistance of the sensor being linearly related to the atmospheric pressure. In operation, the output voltage of the pressure sensor, a function of the atmospheric pressure, is measured using an analog digital converter. In one particular preferred embodiment, the pressure readings are taken every fifteen minutes, however, other time periods between pressure measurements may be utilized (e.g., ten minute intervals). The combination unit also preferably includes a filtering scheme that minimizes the chance of incorrect predictions. Moreover, pressure measurements during lighting of the back light or activation of the alarm are preferably avoided because readings during these times may be inaccurate.

Figure 9:
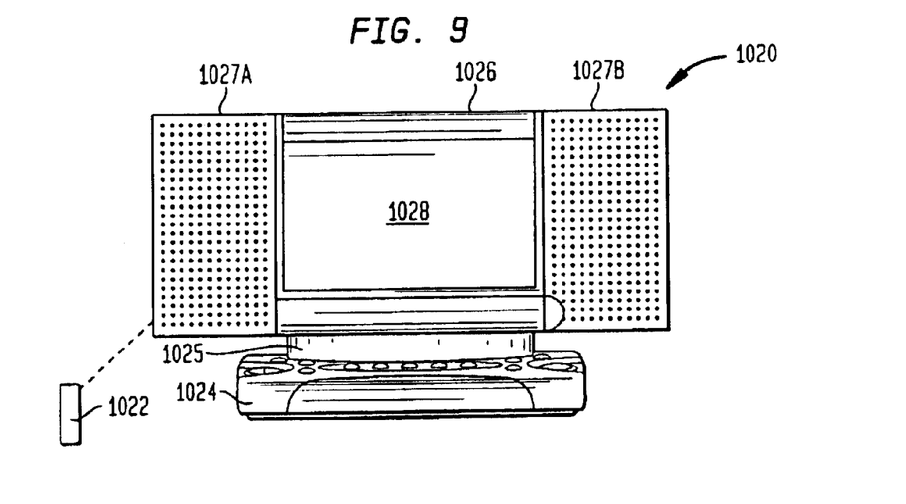
FIG. 9 shows a front elevational view of a combination clock radio, weather station and message organizer, in accordance with other preferred embodiments of the present invention.
Figure 10A:
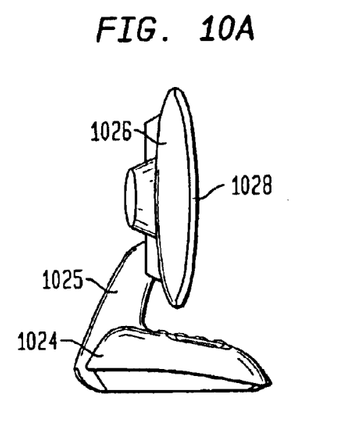
FIGS. 10A and 10B show respective left and right side views of the combination unit of FIG. 9.
Figure 10B:
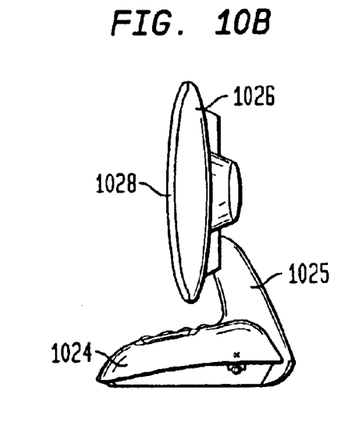

Referring to FIGS. 9, 10a and 10b, a combination clock radio, weather station and message organizer in accordance with other preferred embodiments of the present invention includes a base unit 1020 having a stand 1024, a support element 1025 attached to stand 1024 and a housing 1026 supported by support element 1025. Housing 1026 preferably includes visual display 1028 and speakers 1027a and 1027b secured to opposite ends of housing 1026. The combination unit may also include an outdoor temperature sensor 1022 for obtaining outdoor temperature readings and transmitting such readings to electronic circuitry within housing 1026.

Figure 11:
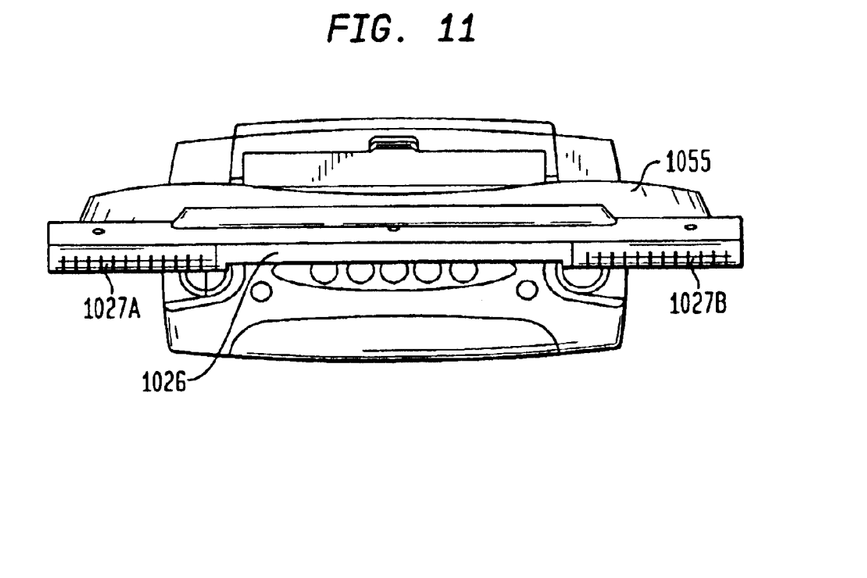
FIG. 11 shows a top plan view of the combination unit of FIG. 9.
Figure 12:
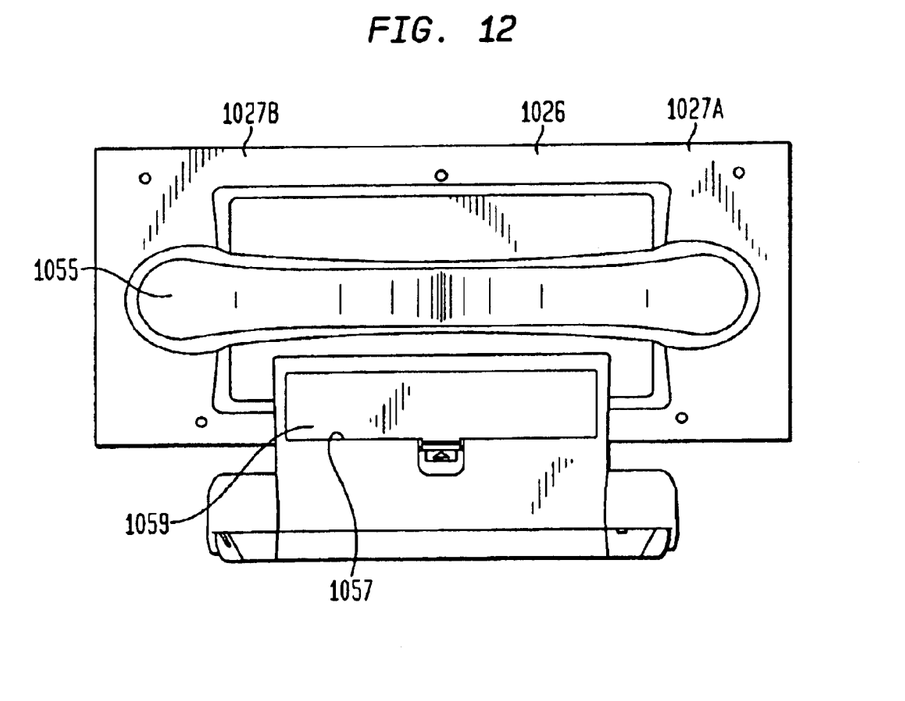
FIG. 12 shows a rear elevational view of the combination unit of FIG. 9.

Referring to FIGS. 11 and 12, the combination unit also preferably includes a lateral support element 1055 for supporting the speakers 1027a, 1027b on opposite sides of housing 1026. The combination unit also desirably includes a battery compartment 1057 enclosed by battery compartment cover 1059.

When the rate of increase of atmospheric pressure is larger than a predetermined level, the weather condition is shifted up one step (e.g. from sun and cloud to sun). Similarly, when the rate of decrease of atmospheric pressure is larger than a predetermined level, the weather condition is shirted down one step (e.g. from cloud to rain).

The radio frequency transmitter preferably transmits at a frequency of 433 MHz, however, other frequencies may be used. The transmission range is approximately up to about 30 meters, however, in other preferred embodiments the transmission range may be greater than 30 meters. The temperature data received by the base unit is demodulated by an RF receiving module and forwarded to the central processor. When the combination unit is initially activated, the radio transmission is turned on for ten minutes, or until it receives data from the radio frequency transmitter. After receiving the data, the receiver is preferably turned on for approximately ten seconds in every three minute interval. The receiver is preferably turned on for five seconds before the expected receiving time (i.e. three minutes from the beginning of the previous data received) and turned off after the data is received. If the data from the radio frequency transmitter is not received or decoded, the previous received data is retained. If the data from the radio frequency transmitter cannot be received and decoded for five consecutive three minute time periods, the radio frequency transmitter is assumed to be dead. As a result, the outdoor temperature will be shown by "———" on the liquid crystal display. If the receiver cannot receive or decode for five consecutive time periods, the radio frequency receiver will not try again for ten minutes of each thirty-minute time period. If the radio frequency receiver can receive the signal, it will once again turn on three minutes after it has received the first signal. A user may activate the radio frequency receiver by pressing the re-sync button.

Referring to FIG. 2, voice messages are recorded by pressing and holding the record button 38. After the message is recorded the corresponding message number 124 (FIG. 6) is shown on the liquid crystal display 28. The "record" button 38 may be pressed again for recording another message which will increase the message number 124 by one. If the message number is over 8, an "F" will be displayed on the visual display to indicate a full condition. Moreover, one BI-BI sound will be generated. In order to play back the messages, the "play" button 40 is pressed once. Pressing the "play" button 40 will play the current message shown until it is finished. The current message being played back can be adjusted up or down by pressing a "forward" button 42 or a "backward" button 44. In order to stop the voice messages during playback, any button may be pressed. When the radio is playing, pressing the "play" button will replay the recorded voice messages. After the messages have been played, the radio will come back on.

In the full alarm mode, the combination unit will provide a significant level of information to a user during wake-up. In one example, an operator has set the wake-up alarm for 7:00 a.m. At the 7:00 a.m. wake-up time, the weather is sunny with a temperature of 70° F., with five messages recorded to playback. A preferred full alarm mode sequence may be the following: an alarm for 5 seconds followed by the message, "Good morning, it is 7 a.m.—the temperature outside is 70 degrees—the weather is going to be sunny. All recorded messages will then be played followed by turning on the radio for one hour.

Figure 13:
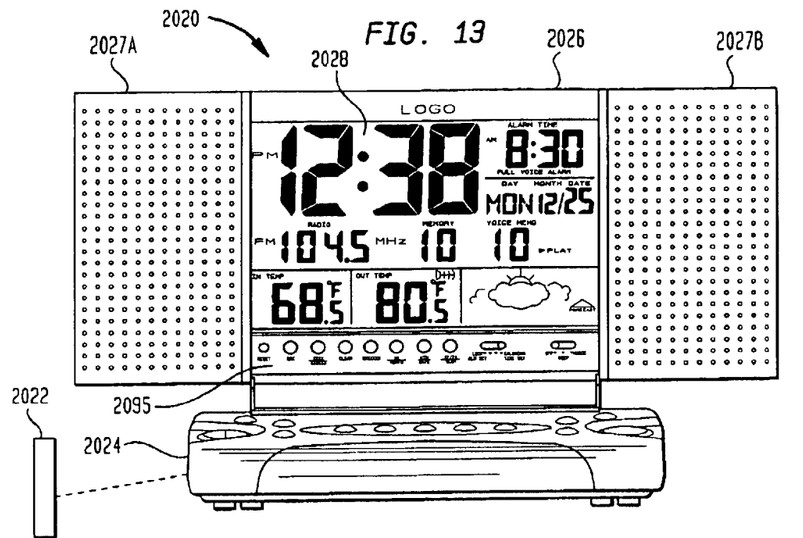
FIG. 13 shows a front elevational view of a combination clock radio, weather station and message organizer, in accordance with other preferred embodiments of the present invention.

FIG. 13 shows a combination clock radio, weather station and message organizer including a base unit 2020 and a temperature sensor 2022 spaced from the base unit 2020. In certain preferred embodiments, the temperature sensor 2022 is in radio frequency communication with the base unit 2020 for wirelessly transmitting outdoor temperature readings and/or pressure readings to the base unit 2020. Base unit 2020 includes control panel 2095 for controlling operation of the clock radio, the alarm, the clock and the calendar. In other preferred embodiments, the panel 2095 may include other buttons or switches for controlling other features of the combination unit. Base unit 2020 also preferably includes a stand 2024, a housing 2026, a visual display 2028 and speakers 2027A, 2027B.

Figure 14:
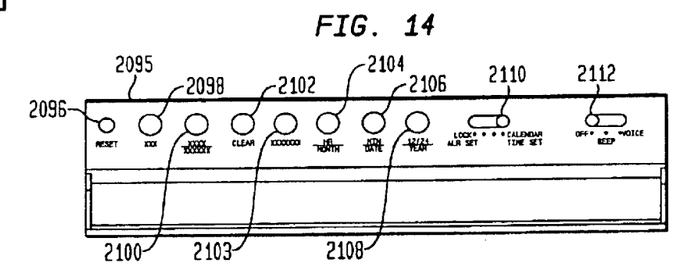
FIG. 14 shows a control panel for the combination clock radio, weather station and message organizer of FIG. 13.

Referring to FIG. 14, in certain preferred embodiments, housing 2026 includes a control panel 2095 having a "reset" button 2096 for resetting the indoor and outdoor temperatures, a "degree-Centigrade/degree-Fahrenheit" button 2098 for displaying the temperature readings in either Celsius or Fahrenheit, a temperature "MAX/MIN" button 2100 for displaying the recently recorded maximum and minimum temperatures, and a "clear" button 2102 for clearing the recently recorded maximum and minimum temperatures. Control panel 2095 also preferably includes a resynchronization button 103, a "hour/month" button 2104, a "minute/day" button 2106 and "12/24 Hr/Yr" button 2108 for setting calendar dates and times. The control panel also includes a "lock/alarm/clock/calendar" switch 2110 and an "off/beep/voice alarm" switch 2112 for selecting the particular element of the calendar, date and/or time to be adjusted. A moveable cover 2094 selectively covers control panel 2095. In certain preferred embodiments, moveable cover 2094 is moveable between a first closed position for completing covering control panel 2095 and a second open position shown in FIG. 14 for providing access to control panel 2095.

Figure 15:
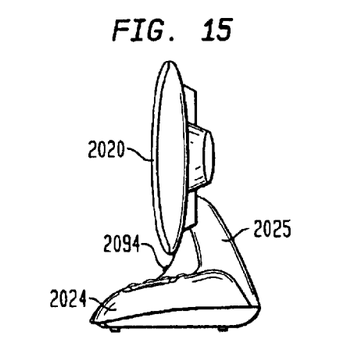
FIG. 15 shows a right side view of the combination unit of FIG. 13.

FIG. 15 is a right side view of the combination unit of FIG. 13, including base unit 2020, stand 2024 and support element 2025 having an upper end attached to base unit 2020 and a lower unit attached to stand 2024. The combination unit includes control panel cover 2094 in an open position for providing access to the control panel (FIG. 14).

Figure 16:
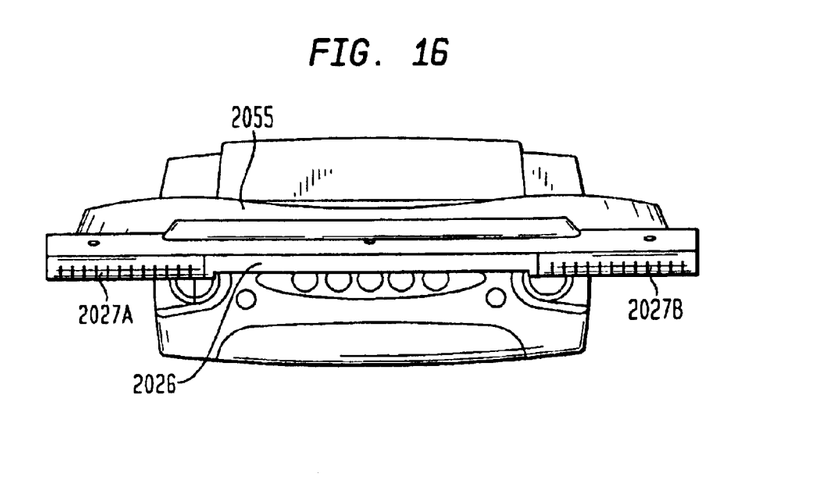
FIG. 16 shows a top plan view of the combination unit of FIG. 13.
Figure 17:
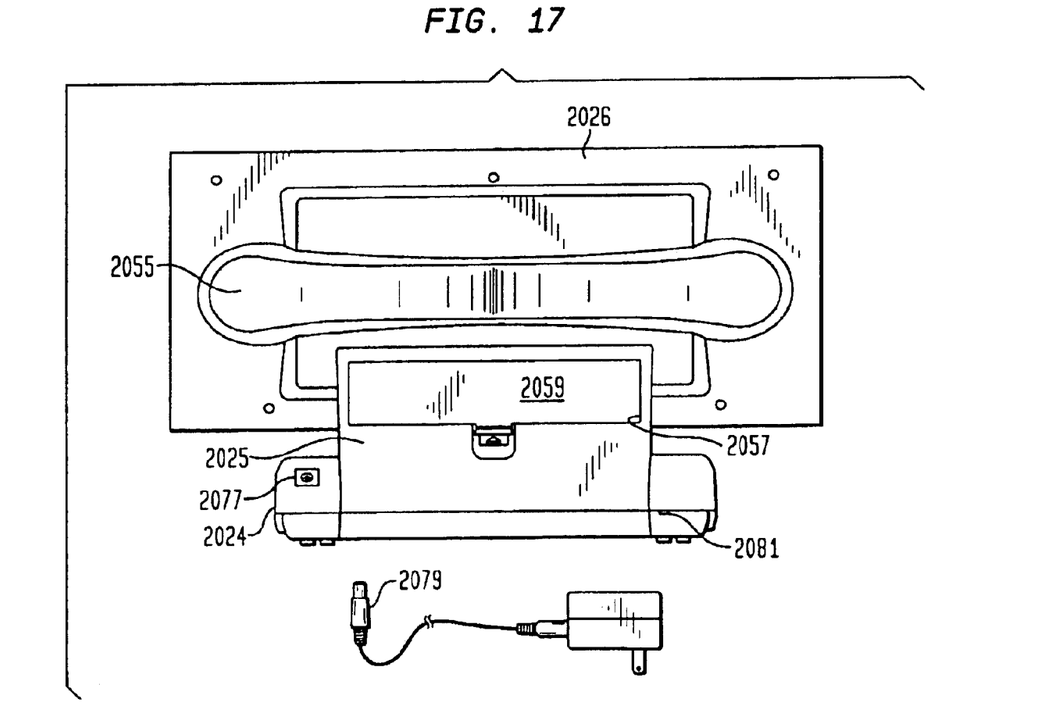
FIG. 17 shows a rear elevational view of the combination unit of FIG. 13.

Referring to FIGS. 16 and 17, the combination unit also preferably includes a lateral support element 2055 for supporting speakers 2027A, 2027B on opposite sides of housing 2026. Referring to FIG. 17, a back side of support element 2025 preferably includes a battery compartment 2057 selectively enclosed by battery compartment 2059. Stand 2024 includes a receptacle 2077 adapted to receive a power cord 2079 and an antenna receptacle 2081 adapted to be coupled with an AM/FM antenna.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A combination clock radio, weather station and message organizer comprising:
    a base unit including a visual display;
    a controller located in said base unit including a central processor for controlling operation of said combination;
    a temperature sensor spaced from said base unit for obtaining outdoor temperature readings, said temperature sensor being in communication with said controller, wherein said controller is adapted to generate a hue on said visual display that is a function of the outdoor temperature reading.

2. The combination as claimed in claim 1, wherein said hue generated on said visual display changes in response to the outdoor temperature reading.

3. The combination as claimed in claim 2, wherein said hue is a first color when the outdoor temperature reading is within a first temperature range and a second color when the outdoor temperature range is within a second temperature range that is exclusive of said first temperature range.

4. The combination as claimed in claim 3, wherein said hue is a third color when the outdoor temperature range is within a third temperature range that is exclusive of said first and second temperature ranges.

5. The combination as claimed in claim 4, wherein said first color is blue, said second color is amber and said third color is red.

6. The combination as claimed in claim 4, wherein said first temperature range is between −50 and 50° F., said second temperature range is between 50.1 and 75.0° F. and said third temperature range is between 75.1 and 140° F.

7. The combination as claimed in claim 1, wherein said temperature sensor is spaced from said base unit and includes a radio frequency transmitter for transmitting the outdoor temperature readings to said base unit.

8. The combination as claimed in claim 7, further comprising a radio frequency receiver associated with said base unit, said radio frequency receiver being adapted to receive the outdoor temperature readings transmitted by said radio frequency transmitter and communicate the outdoor temperature readings to said controller.

9. The combination as claimed in claim 1, further comprising a pressure sensor in communication with said controller for measuring atmospheric pressure, wherein said controller is adapted to select one of a plurality of weather forecast animations as a function of a rate of change of said measured atmospheric pressure and to generate the selected weather forecast animation on said visual display.

10. The combination as claimed in claim 9, wherein said plurality of weather forecast animations are selected from the group consisting of a sun animation, a sun and cloud animation, a cloud animation, a rain animation, and a storm animation.

11. The combination as claimed in claim 9, wherein each said weather forecast animation comprises a series of images that are generated on said visual display to give the illusion of motion.

12. The combination as claimed in claim 9, wherein said controller is adapted to select one of a plurality of weather tendency indicators as a function of the rate of change of the atmospheric pressure and to generate the selected weather tendency indicator on said visual display.

13. The combination as claimed in claim 12, wherein said plurality of weather tendency indicators are selected from the group consisting of a tendency up indicator, a tendency down indicator, and a tendency steady indicator.

14. The combination as claimed in claim 1, further comprising:
a microphone in communication with said controller for recording spoken messages;
a memory device for storing said recorded spoken messages;
a speaker in communication with said controller for broadcasting said recorded spoken messages at a predetermined wake-up time.

15. The combination as claimed in claim 14, wherein upon reaching said predetermined wake-up time, said controller will broadcast through said speaker at least one wake-up alarm, a voice message related to the predetermined wake-up time, and a voice message related to the outdoor temperature reading, and the recorded spoken messages.

16. The combination as claimed in claim 14, further comprising:
movable keys associated with said base unit and in communication with said controller for selecting a radio band, the predetermined wake-up time and commencing recordation of said spoken messages.

17. A combination clock radio, weather station and message organizer comprising:
a base unit including a visual display;
a controller located in said base unit including a central processor for controlling operation of said combination;
a pressure sensor for measuring atmospheric pressure in communication with said controller;
a remote temperature sensor spaced from said base unit for obtaining outdoor temperature readings, said temperature sensor including a radio frequency transmitter for transmitting signals related to the outdoor temperature readings;
a radio frequency receiver provided in said base unit for receiving the signals related to the outdoor temperature readings and communicating said signals to said controller, wherein said controller is adapted to select one of a plurality of weather tendency forecast animations as a function of the atmospheric pressure and to generate the selected weather forecast animations on said visual display, and wherein said controller is adapted to generate a hue on said visual display that is a function of the outdoor temperature reading.

18. The combination as claimed in claim 17, wherein said visual display is a liquid crystal display adapted to display said hue on a color scale running from violet though blue, green, and yellow to red.

19. The combination as claimed in claim 17, wherein said base unit includes a stand, a support element connected to said stand, and a housing including said visual display connected to said support element.

20. The combination as claimed in claim 19, wherein said support arm includes a pivotal connection between said housing and said stand.

21. The combination as claimed in claim 19, wherein said base unit includes movable keys in communication with said controller for selecting a radio band, selecting a wake-up time and date, and commencing recordation of said one or more spoken memoranda.

22. The combination as claimed in claim 17, further comprising:
a microphone in communication with said controller for recording spoken messages;
a memory device for storing said recorded spoken messages;
a speaker in communication with said controller for broadcasting radio signals, at least one wake-up alarm signal and said recorded spoken messages.

23. The combination as claimed in claim 17, wherein said temperature sensor is a thermistor and said pressure sensor is adapted to produce an output signal that is linearly related to the atmospheric pressure.

24. A combination clock radio, weather station and message organizer comprising:
a base unit including a visual display for presenting radio band information, time information, date information, weather information, and spoken messages information;
a microphone for recording said spoken messages;
a speaker for broadcasting radio signals, at least one wake-up alarm and said recorded spoken messages;
a controller associated with said base unit, said controller including a central processor for controlling operation of said combination, said central processor being in communication with said microphone and said speaker;
a temperature sensor spaced from and in communication with said base unit for obtaining outdoor temperature readings and transmitting said outdoor temperature readings to said base unit; and
data entry keys associated with said base unit for selecting one or more radio stations, selecting a predetermined wake-up time, and recording said spoken messages, wherein upon reaching the predetermined wake-up time, said controller will generate through said speaker a wake-up alarm, a voice message related to said predetermined wake-up time, a voice message related to said outdoor temperature, and any previously recorded spoken messages.

25. The combination as claimed in claim 24, wherein said temperature sensor includes a radio frequency transmitter for wireless transmission of said outdoor temperature readings and said base unit includes a radio frequency receiver for receiving said wirelessly transmitted outdoor temperature readings.

26. The combination as claimed in claim 24, further comprising a pressure sensor associated with said base unit for measuring atmospheric pressure, said pressure sensor being in communication with said controller, wherein said controller is adapted to select one of a plurality of weather forecast animations as a function of a rate of change of the atmospheric pressure and to present the selected weather forecast animation on said visual display.

27. The combination as claimed in claim 24, wherein said controller is adapted to generate a hue on said visual display that is a function of said outdoor temperature reading and to change said hue in response to said outdoor temperature reading.

28. The combination as claimed in claim 27, wherein said hue is a first color when said outdoor temperature reading is within a first temperature range, a second color when said outdoor temperature reading is within a second temperature range that is exclusive of said first temperature range, and a third color when said outdoor temperature reading is within a third temperature range that is exclusive of said second temperature range.

29. The combination as claimed in claim 28, wherein said first color is blue, said second color is amber and said third color is red.

30. The combination as claimed in claim 24, further comprising a second temperature sensor associated with said base unit for obtaining indoor temperature readings and communicating said indoor temperature readings with said controller, wherein said controller is adapted to generate said indoor temperature readings on said visual display.

* * * * *